(12) United States Patent
Kordit et al.

(10) Patent No.: US 11,850,916 B2
(45) Date of Patent: Dec. 26, 2023

(54) RECREATIONAL VEHICLE HEATING SYSTEM

(71) Applicants: Evsey Avrumovich Kordit, Samara (RU); Petr Evseevich Kordit, Samara (RU); Aleksandr Petrovich Kordit, Samara (RU)

(72) Inventors: Evsey Avrumovich Kordit, Samara (RU); Petr Evseevich Kordit, Samara (RU); Aleksandr Petrovich Kordit, Samara (RU)

( * ) Notice: Subject to any disclaimer, the term of this patent is extended or adjusted under 35 U.S.C. 154(b) by 0 days.

(21) Appl. No.: 17/646,214

(22) Filed: Dec. 28, 2021

(65) Prior Publication Data

US 2022/0355647 A1 Nov. 10, 2022

(30) Foreign Application Priority Data

May 4, 2021 (RU) .......................... RU2021112833

(51) Int. Cl.
*B60H 1/03* (2006.01)
*F24D 19/10* (2006.01)
(Continued)

(52) U.S. Cl.
CPC ........... *B60H 1/03* (2013.01); *F24D 19/1066* (2013.01); *F24H 1/009* (2013.01); *F24H 15/156* (2022.01)

(58) Field of Classification Search
CPC .................................................... F24H 1/205
(Continued)

(56) References Cited

U.S. PATENT DOCUMENTS 2,374,757 A * 5/1945 Koppel ................... F24H 1/205
237/19
3,955,556 A * 5/1976 Pangborn ................ F24H 1/205
122/18.1
(Continued)

FOREIGN PATENT DOCUMENTS

KR         10-0286568 B1      3/2001
KR     10-2007-0045992 A      5/2007
(Continued)

OTHER PUBLICATIONS

Russian Federation Office Action dated May 4, 2021 in Russian Federation Patent Application No. 2021112833/11(027275) (with English translation), 4 pages.

*Primary Examiner* — Steven B McAllister
*Assistant Examiner* — John E Bargero
(74) *Attorney, Agent, or Firm* — Oblon, McClelland, Maier & Neustadt, L.L.P.

(57) ABSTRACT

A recreational vehicle heating system comprises: a heating medium heater, a hot water supply heat exchanger, a heating medium circuit including a pump and a waste heat exchanger, and a heating medium tank compartmented by vertical partitions configured to allow for the heating medium flow over the partitions from one compartment to another in a sequential order, the hot water supply heat exchanger being arranged in one of the tank compartments, while the other tank compartments are part of heating medium circuits each including a pump and a waste heat exchanger. The first tank compartment in said sequential order is connected, via a conduit, to the heating medium heater, while the last tank compartment in said sequential order is configured to allow for the heating medium flow over to the conduit for the heating medium transfer by a pump via the heater to the first compartment.

5 Claims, 1 Drawing Sheet

(51) Int. Cl.
*F24H 1/00* (2022.01)
*F24H 15/156* (2022.01)

(58) Field of Classification Search
USPC ...... 237/5; 122/18.2, 19.1, 92; 165/154, 155
See application file for complete search history.

(56) References Cited

U.S. PATENT DOCUMENTS

| | | |
|---|---|---|
| 6,332,580 B1 | 12/2001 | Enander et al. |
| 10,697,648 B2 * | 6/2020 | Tamaki ................ F24D 3/18 |
| 2004/0079749 A1 * | 4/2004 | Young ................ F24H 9/2021 |
| | | 219/486 |
| 2013/0307273 A1 * | 11/2013 | Afremov ................ F03G 6/02 |
| | | 290/52 |
| 2014/0027523 A1 | 1/2014 | Kloepfer |

FOREIGN PATENT DOCUMENTS

| | | |
|---|---|---|
| RU | 2 759 527 C1 | 11/2021 |
| SU | 945599 A1 | 8/1982 |

* cited by examiner

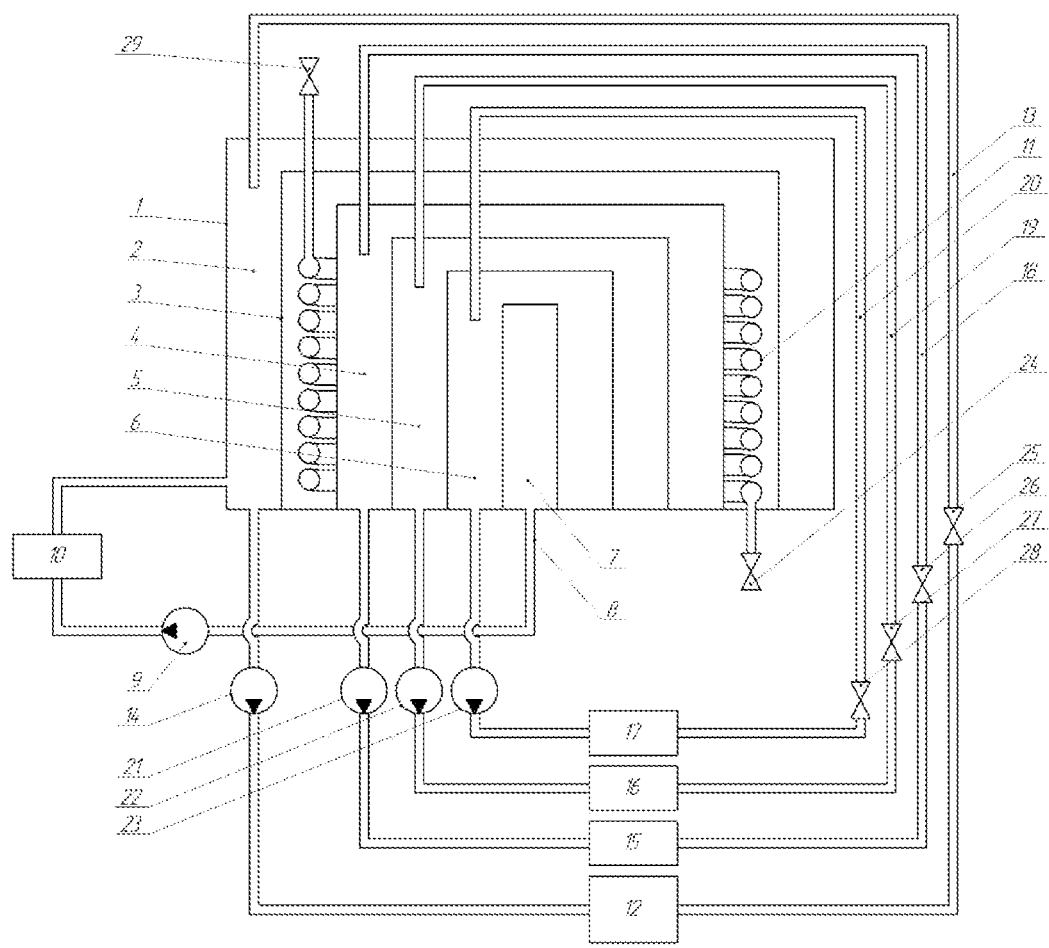

RECREATIONAL VEHICLE HEATING SYSTEM

TECHNICAL FIELD

The present invention relates to heating systems for use in a recreational vehicle, i.e. a van that includes living quarters, which may be either configured as a trailer, or integrated with a self-propelled vehicle.

BACKGROUND

Recreational vehicle heating systems typically use an independent heat source for various purposes that include space heating, such as floor heating, hot water provision, as well as for the vehicle or motor boat engine preheating.

On the other hand, such as where there is a need for engine preheating, it is wise to employ most of the heating medium for this purpose, while when hot water is used, it is wise to increase the heating medium flow rate for the water heating purpose. It is important that the heating medium flow rate be priority-based. It is, therefore, essential not only to provide for the heating medium flow rate for all purposes based on assigned priorities, but also provide for reassignment of such priorities.

The prior art closest to the claimed recreational vehicle heating system is a vehicle heating system disclosed in U.S. Pat. No. 6,332,580 dd. 25 Dec. 2001, which system comprises a heating medium heater, a hot water supply heat exchanger, and a heating medium circuit including a pump and a waste heat exchanger.

However, the prior art solution does not address the problem of reassigning the heating medium flow rate priorities, thus not making it possible to reduce energy consumption.

The claimed invention is aimed at taking into account the heating medium flow rate priorities and at reducing overall energy consumption.

SUMMARY OF THE INVENTION

A technical effect achieved by using the claimed invention is that a recreational vehicle heating energy consumption is reduced through employing priority-based heating medium flow rates. Herein, the heating medium flow rate is redistributed automatically upon activation of a pump in a particular heating medium circuit due to a heating medium tank's compartments being interconnected.

The above technical results are achieved in a recreational vehicle heating system, comprising: a heating medium heater, a hot water supply heat exchanger, a heating medium circuit including a pump and a waste heat exchanger, and a heating medium tank compartmented by vertical partitions configured to allow for the heating medium flow over the partitions from one compartment to another in a sequential order, the hot water supply heat exchanger being arranged in one of the tank compartments, while the other tank compartments are part of heating medium circuits each including a pump and a waste heat exchanger. The first tank compartment in said sequential order is connected, via a conduit, to the heating medium heater, while the last tank compartment in said sequential order is configured to allow for the heating medium flow over to the conduit connecting the last tank compartment to the heating medium heater and a pump for the heating medium transfer to the first compartment.

The heating medium tank may be cylinder-shaped and compartmented by vertical cylinder-shaped partitions configured to allow for the heating medium flow over the partitions from one compartment to another in a sequential order. The tank may have other shape, such as a shape of a rectangular parallelepiped, in which case the vertical partitions may be plate-shaped.

The heating medium tank may be compartmented by thermally insulating vertical partitions. Another embodiment of the partitions may, for example, include separating the compartment having the hot water supply heat exchanger from an adjacent compartment by a heat conductive vertical partition, while the other vertical partitions separating the compartments from each other are thermally insulating.

The heating medium tank may include a first compartment having the hot water supply heat exchanger, a second compartment being part of the engine preheating circuit, while each of the next one or more compartments is part of a space heating circuit including a waste heat exchanger, in which case the heating medium heater is connected, via a conduit, to a lower portion (bottom) of the first compartment, and the conduits of the engine preheating circuit and the space heating circuits including waste heat exchangers draw the heating medium off from a bottom opening in the second and the third compartments, respectively, and deliver the heating medium to said compartments' top portions.

The first compartment may be part of the engine preheating circuit, while the second compartment has arranged in it the hot water supply heat exchanger, and the third compartment is part of a space heating circuit including a waste heat exchanger, in which case the heating medium heater is connected to the first compartment lower portion via a conduit, and the conduits of the engine preheating circuit and the space heating circuit including a waste heat exchanger draw the heating medium off from a bottom opening in the second and the third compartments, respectively, and deliver the heating medium to said compartments' top portions.

BRIEF DESCRIPTION OF THE DRAWINGS

The FIGURE shows a schematic view of a recreational vehicle heating system.

DETAILED DESCRIPTION

As shown in the FIGURE, a recreational vehicle heating system includes a heating medium tank 1 which is cylinder-shaped and compartmented into compartments 2, 3, 4, 5, 6 and 7 by vertical cylinder-shaped thermally insulating partitions configured to allow for the heating medium flow over the concentrically arranged and decreasing in height partitions in the following sequential order: from the compartment 2 into the compartment 3, from the compartment 3 into the compartment 4, from the compartment 4 into the compartment 5, from the compartment 5 into the compartment 6, and from the compartment 6 into the compartment 7, the latter being continued by a conduit 8 for the heating medium transfer, by a pump 9, via the heating medium heater 10 into the tank 1 lower portion. The tank 1 top portion, above the compartments, contains air and remains at atmospheric pressure.

A hot water supply heat exchanger 11 is arranged in the compartment 3.

Each of the compartments 2, 4, 5 and 6 is part of a heating medium circuit including a pump and a waste heat exchanger. The compartment 2 is part of the engine preheating circuit 12 including a conduit 13 and a pump 14 that transfers the heating medium from the compartment 2 bottom, via the conduit 13, into the compartment 2 top portion.

Each of the compartments 4, 5 and 6 is part of a circuit including a waste heat exchanger 15, 16 and 17, respectively, for example, a non-autonomous heater for space heating, which includes the respective conduits 18, 19 and 20, with the pumps 21, 22 and 23 pumping the heating medium from the bottoms of the compartments 4, 5 and 6 via the conduits 15, 16 and 17 into the top portions of the compartments 4, 5 and 6.

For a recreational vehicle built on the basis of an internal combustion engine (ICE) vehicle, the ICE pre-start preheating circuit 12 has the highest priority. When the engine is being started, the major portion of thermal energy must be drawn by the respective heating medium circuit pre-heating the vehicle engine. The more the engine gets preheated, the less must be the thermal energy proportion drawn to heat it, which portion must be minimized as soon as the required engine temperature level is reached.

As the heat portion drawn by the highest priority circuit is decreasing, the heat portion drawn by the next, i.e. lower, priority level circuit is increasing. Specifically, the priority lower than that of the pre-start heating circuit, but higher than that of the living space air heating, has the distributed domestic water heating circuit.

When establishing zones with different required air temperatures, each such zone provided with its own heat exchanger having an individual thermal loop for temperature maintenance, higher priorities are assigned to the zones where higher temperatures are required.

Priorities of the circuits including the compartments 2, 3, 4, 5 and 6 sequentially decrease accordingly.

The heating medium delivered from the heater 10 to the tank 1 compartment 2 has a maximum temperature $T_1$. Temperature in the compartment 2 from where the heating medium is delivered to the ICE reaches $T_2$ which is lower than $T_1$, since a portion of heat is consumed to heat the ICE. In turn, the compartment 3 temperature is maintained at $T_3$ which is lower than $T_2$, since the compartment 3 is used to heat cold water to be delivered via valve 29 to the heat exchanger 11 from where, after heating, it is delivered via a hot water delivery valve 24, for domestic needs. Similarly, sequentially decreasing temperature values are established in the circuits including the compartments 4, 5 and 6. For example, if the pump 16 of the respective tosol liquid coolant circuit is off, then the tosol liquid coolant is neither delivered to this circuit's heater, nor returned to the compartment 5 via the conduit 19. However, the compartment 5 is filled with the tosol liquid coolant due to it being delivered by flowing over from the adjacent compartment 4.

The initial volume of a heating medium, e.g. the tosol liquid coolant, in the system is sufficient to fill the tank compartments formed by the coaxial thermally insulating partitions, including the central compartment 7 from where, through its bottom opening, the tosol liquid coolant is delivered, by the pump 9, to the heating boiler 10 and the conduits via which the tosol liquid coolant is returned, after having flowed past the non-autonomous heaters, to the tank's respective zones. The initial volume of the tosol liquid coolant in the system is calculated so as to ensure that its amount in the central compartment is always sufficient for transfer (flow over) to the heater and from the heater to the tank's hottest compartment.

Where necessary to prevent excess heating medium overflow from the conduits delivering the heating medium to the compartments' top portions, the conduits may be provided with valves 25, 26, 27, and 28 shutting off the heating medium delivery from the conduits, when the pump in a respective heating medium circuit is off.

The recreational vehicle heating system may be controlled, for example, through a set of switches of the heater 10 with the pump 9 and of the pumps 14, 21, 22 and 23.

The invention claimed is:

1. A recreational vehicle heating system comprising:
   a heating medium tank,
   a heating medium heater, and
   at least one heating medium circulation circuit with a pump and recuperative heat exchanger,
   wherein the heating medium tank compartmented by vertical partitions configured to allow for the heating medium flow over the partitions from one compartment to another in a sequential order from a first tank compartment to a last tank compartment, one of the tank compartments has arranged therein the heat exchanger of hot water supply external circuit, while another tank compartment is part of the at least one heating medium circulation circuit, the first tank compartment in said sequential order being connected, via a conduit, to the heating medium heater, while the last tank compartment in said sequential order is configured to allow for the heating medium flow over to a conduit with a pump for the heating medium transfer via the heating medium heater to the first tank compartment.

2. The system of claim 1, wherein the heating medium tank is cylinder-shaped and compartmented by vertical partitions which are cylindrical-shaped configured to allow for the heating medium flow over the partitions from one compartment to another in the sequential order.

3. The system of claim 1, wherein the heating medium tank is compartmented by vertical partitions that are thermally insulating.

4. The system of claim 1, wherein the heating medium tank includes the first tank compartment having the heat exchanger of hot water supply external circuit, while a second tank compartment in said sequential order is part of an engine preheating external circuit, and each of the next tank compartments is part of a space heating circuit, wherein the heating medium heater is connected, via a conduit, to a lower portion of the first tank compartment, and the conduits of the engine preheating external circuit and the space heating circuits draw the heating medium off from a bottom opening in the second and the subsequent tank compartments in said sequential order, respectively, and deliver the heating medium to said compartments' top portions.

5. The system of claim 4, wherein the first tank compartment is part of the engine preheating external circuit, the second tank compartment in said sequential order has arranged therein the heat exchanger of hot water supply external circuit, a third tank compartment in said sequential order is part of a space heating circuit including a waste heat exchanger, wherein the heating medium heater is connected to the first compartment lower portion via a conduit, and the conduits of the engine preheating external circuit and the space heating circuit draw the heating medium off from a bottom opening in the second and the third compartments, respectively, and deliver the heating medium to said compartments' top portions.

* * * * *